(12) United States Patent
Fichtner et al.

(10) Patent No.: US 7,789,959 B2
(45) Date of Patent: Sep. 7, 2010

(54) COATING AGENTS THAT ARE DEVOID OF PRESERVATIVES, METHOD FOR THEIR PRODUCTION AND USE THEREOF

(75) Inventors: Thomas Fichtner, Dalheim (DE); Ivan Cabrera, Dreieich (DE); Bernhard Momper, Weilburg (DE)

(73) Assignee: Celanese Emulsions GmbH, Kronberg/Ts. (DE)

( * ) Notice: Subject to any disclaimer, the term of this patent is extended or adjusted under 35 U.S.C. 154(b) by 634 days.

(21) Appl. No.: 11/596,507

(22) PCT Filed: May 4, 2005

(86) PCT No.: PCT/EP2005/004826

§ 371 (c)(1),
(2), (4) Date: Jan. 10, 2007

(87) PCT Pub. No.: WO2005/111158

PCT Pub. Date: Nov. 24, 2005

(65) Prior Publication Data

US 2008/0269397 A1    Oct. 30, 2008

(30) Foreign Application Priority Data

May 12, 2004    (DE) .................. 10 2004 023 374

(51) Int. Cl.
 *C08L 43/04*    (2006.01)
(52) U.S. Cl. .................. 106/603; 106/600; 516/72; 524/806; 524/817; 524/819; 524/823; 524/832; 524/833; 526/279; 526/322; 526/324; 526/325; 526/330; 526/331
(58) Field of Classification Search .......... None
See application file for complete search history.

(56) References Cited

U.S. PATENT DOCUMENTS

| | | | |
|---|---|---|---|
| 5,371,137 A * | 12/1994 | Blincow et al. | 524/564 |
| 5,567,750 A | 10/1996 | Schulze et al. | |
| 6,534,177 B2 | 3/2003 | Kohlhammer et al. | |
| 6,569,939 B2 | 5/2003 | Eck et al. | |
| 6,746,555 B1 * | 6/2004 | Kunstle et al. | 156/71 |
| 2003/0127024 A1 | 7/2003 | Heiberger et al. | |
| 2004/0097622 A1 | 5/2004 | Weitzel | |
| 2004/0204518 A1 | 10/2004 | Harzschel et al. | |
| 2005/0014881 A1 | 1/2005 | Weitzel et al. | |
| 2007/0088120 A1 * | 4/2007 | Zecha et al. | 524/832 |

FOREIGN PATENT DOCUMENTS

| | | |
|---|---|---|
| DE | 39 32 990 | 4/1990 |
| DE | 100 01 831 | 8/2001 |
| DE | 100 04 319 | 8/2001 |
| DE | 100 10 860 | 12/2001 |
| DE | 100 30 447 | 1/2002 |
| DE | 102 53 045 | 6/2004 |
| DE | 103 16 079 | 11/2004 |
| DE | 103 32 526 | 2/2005 |
| EP | 0 230 220 | 7/1987 |
| GB | 2 385 856 | 9/2003 |
| JP | 56-070060 | 6/1981 |
| JP | 56-082852 | 7/1981 |
| JP | 2000-319605 | 11/2000 |
| RU | 2121486 | 11/1998 |

* cited by examiner

*Primary Examiner*—Marc S Zimmer
(74) *Attorney, Agent, or Firm*—Connolly Bove Lodge & Hutz LLP

(57) ABSTRACT

A description is given of coating compositions comprising at least one strongly basic agent to set a pH of at least 10, at least one selected vinyl ester copolymer, if desired, pigment and/or filler, and, if desired, further additives customary per se.

The coating compositions can be stored without use of additional preservatives and can be used to coat substrates of all kinds.

18 Claims, No Drawings

COATING AGENTS THAT ARE DEVOID OF PRESERVATIVES, METHOD FOR THEIR PRODUCTION AND USE THEREOF

RELATED APPLICATIONS

This application is a national stage application (under 35 U.S.C. 371) of PCT/EP2005/004826 filed May 4, 2005, which claims benefit of German application 10 2004 023 374.8 filed May 12, 2004.

The present invention relates to preservative-free dispersion-based paints (emulsion paints) or varnishes which comprise improved copolymeric polyvinyl esters as binders. With the polymer dispersions used in accordance with the invention it is possible to produce preservative-free emulsion paints and other coating materials in the form of aqueous preparations which can be used as architectural preservation compositions.

In accordance with the prior art, architectural preservation compositions, such as emulsion paints, renders, filling compounds, and file adhesives, for example, contain greater or lesser amounts of preservative in order to prevent infestation by microorganisms and in order to achieve a satisfactory storage stability. A disadvantage in this context is that the preservatives known to date in the prior art, examples being isothiazolinones or formaldehyde donors, are generally not compatible for allergy sufferers.

The prior art has already disclosed a number of preservative-free emulsion paints. There are products known in which waterglass or highly alkaline buffer systems are used in order to allow the absence of preservative.

For instance DE-A-100 30 447 describes a preservative-free paint which comprises selected fractions of polymer dispersion, pigment or filler, waterglass, and water.

RU-C-21 21 486 discloses paint or varnish formulations which comprise emulsifier, alkali metal phosphate, waterglass, polysiloxane, pigments or fillers, thickeners, and binders.

DE-A-100 01 831 describes a silicatic coating composition comprising waterglass, organic ammonium compound, filler, and, if desired, polymeric binder.

DE-A-199 25 412 discloses a silicate-bound coating material which in addition to a silicate binder comprises at least one water-soluble organic nitrogen compound as stabilizer and, if desired, a water-dispersible or water-soluble binder, polyvinyl acetate for example.

These known formulations comprise pigments and/or fillers, waterglass, and, in general, polymer dispersions as well. Owing to the high waterglass fraction, these formulations are highly alkaline and there is no need for additional preservatives. The polymer dispersions to be used must, however, be stable to hydrolysis at high pH levels. Consequently these systems have to date used primarily styrene/acrylate copolymers or polymer (meth)acrylates, since these polymers have been found superior to other types of polymer, on account of their effective hydrolysis resistance.

It has emerged, however, that the pigment-binding capacity and odor of such dispersions are significantly restricted as compared with systems containing binder based on vinyl esters, examples being vinyl acetate-ethylene copolymer dispersions ("VAE copolymer dispersions"). With the use of VAE copolymer dispersions, however, it has been found that they are of only limited suitability for very high pH ranges, since the formulations produced using them lack sufficient hydrolysis stability and storage stability.

One object of the present invention lies in the provision of a preservative-free coating composition which is sufficiently hydrolysis-stable and storage-stable.

A further object of the present invention lies in the provision of pigment- and/or filler-containing coating compositions which have high pigment volume concentrations (PVC) of at least 60% and which possess a high pigment-binding capacity.

A further object of the present invention lies in the provision of a preservative-free coating composition which on storage alters its pH and the thixotropic behavior as little as possible and in respect of which the formation of odor-forming constituents is largely suppressed.

Yet a further object of the present invention consisted in the provision of a simple and economic method of producing preservative-free coating compositions.

It has now been found, surprisingly, that with the use of selected copolymers it is possible to achieve the objects referred to above.

The invention provides preservative-free aqueous coating compositions having a pH of at least 10, comprising
- a) at least one strongly basic agent to set the pH, in particular at least one water-soluble silicate,
- b) at least one emulsion of a copolymer derived from
  - A1) vinyl esters of aliphatic saturated carboxylic acids having a chain length of $C_1$-$C_4$ in particular vinyl acelate
  - A2) alpha-olefins having 2 to 8 carbon atoms, in particular ethylene, and/or
  - A3) vinyl esters of aliphatic saturated carboxylic acids having a chain length of $C_5$-$C_{18}$, in particular vinyl esters of α-branched carboxylic acids having from 5 to 11 carbon atoms in the acid radical (®Versatic acids),
  - A4) if desired, ethylenically unsaturated monomers containing silane groups, and
  - A5) if desired, further comonomers,
  - the sum of components A1, A2 and/or A3 and where appropriate A4 and/or A5 making 100% by weight,
- c) if desired, pigment and/or filler, and
- d) if desired, further additives customary per se.

As component a) of the coating composition of the invention it is possible to use any water-soluble strong base with which the composition can be set to a pH of at least 10.

The pH of the composition of the invention is at least 10, preferably 10.5 to 14, and with very particular preference 11 to 13.

Examples of water-soluble strong bases of component a) are alkali metal hydroxides, such as lithium, sodium or potassium hydroxide, buffer systems with buffering ranges of at least pH 10, such as phosphate buffers with buffering ranges of at least pH 10 or aqueous alkali metal hydroxide solutions with amino acids, such as glycine, which act as buffers with a buffering range of at least 10, and, in particular, water-soluble silicates.

A preferred component a) is a water-soluble silicate. This is typically a water-soluble alkali metal silicate, a lithium silicate for example, sodium or, preferably, a potassium silicate. The pH values of the aqueous solutions of component a) range typically from 10.0 to 13.5. The amount of alkali metal silicate is typically 5% to 50% by weight, based on the aqueous solution.

A component a) used with preference is potassium waterglass.

The fraction of component a) in the coating composition of the invention is typically up to 5%, preferably 0.5% to 3%, in particular 0.5% to 2.0%, by weight based on the total solids content.

The aqueous copolymeric polyvinyl ester dispersion used in accordance with the invention is notable for a high hydrolysis stability at high pH values. Without being tied to one theory it is assumed that initially there is hydrolysis of the polymer particles, producing water-insoluble hydrolysis products which then form a protective coat against any further hydrolysis.

These copolymers derive from monomers of types A1, A2, and, if desired, A4 and/or, if desired, A5), or A1, A3, and, if desired, A4 and/or, if desired, A5), or, preferably, from monomers of types A1, A2, A3, and, if desired, A4 and/or, if desired, A5).

The vinyl esters A1 of aliphatically saturated carboxylic acids with a chain length $C_1$-$C_4$ are vinyl esters of linear or branched aliphatic carboxylic acids, such as vinyl formate, vinyl acetate, vinyl propionate, vinyl butyrate or vinyl isobutyrate, for example. Vinyl acetate is preferred. The vinyl esters A1 can also be present in the polyvinyl ester in a combination of two or more thereof alongside one another.

The fraction of the monomers A1, in combination where appropriate with further comonomers from this group, is 40% to 95%, preferably 50% to 76%, by weight based on the total amount of the monomers employed.

The alpha-olefins having 2 to 8 carbon atoms, A2, are branched or linear alpha-olefins, examples being prop-1-ene, but-1-ene, pent-1-ene, hex-1-ene, hept-1-ene, oct-1-ene, and, in particular, ethylene, The fraction of the monomers A2, in combination where appropriate with further comonomers from this group, is 0% to 45%, preferably 5% to 45%, more preferably 8% to 25%, very preferably 10% to 20%, by weight based on the total amount of the monomers employed.

The vinyl esters A3 of aliphatic saturated carboxylic acids of chain length $C_5$-$C_{18}$ are vinyl esters of linear or, preferably, of branched aliphatic carboxylic acids, examples being vinyl esters of α-branched carboxylic acids having 5 to 11 carbon atoms in the acid radical (®Versatic acids), the vinyl esters of pivalic, 2-ethylhexanoic, lauric, palmitic, myristic, and stearic acid. Vinyl esters of Versatic acids, especially VeoVa® 9, VeoVa® 10, and VeoVa® 11, are preferred. The vinyl esters A3 can also be present in the polyvinyl ester in a combination of two or more thereof alongside one another.

The fraction of the monomers A3, in combination where appropriate with further comonomers of this group, is 2% to 60%, preferably 2% to 40%, more preferably 4% to 30%, very preferably 5% to 25%, by weight based on the total amount of the monomers employed.

The monomers A4 containing ethylenically unsaturated silane groups are typically monomers of the formula Rsi$(CH_3)_{0-2}(OR^1)_{3-1}$, in which R has the definition $CH_2=CR^2-(CH_2)_{0-1}$ or $CH_2=CR^2CO_2-(CH_2)_{1-3}$, $R^1$ is a branched or unbranched, optionally substituted alkyl radical having 1 to 12 carbon atoms, which optionally can be interrupted by an ether group, and $R^2$ is H or $CH_3$.

Preference is given to silanes of the formulae $CH_2=CR^2-(CH_2)_{0-1}Si(CH_3)_{0-2}(OR^1)_{3-2}$ and $CH_2=CR^2CO_2-(CH_2)_3Si(CH_3)_{0-1}(OR^1)_{3-2}$, in which $R^1$ is a branched or unbranched alkyl radical having 1 to 8 carbon atoms and $R^2$ is H or $CH_3$.

Particularly preferred silanes are vinylmethyl-dimethoxy-silane, vinylmethyl-diethoxy-silane, vinylmethyl-di-n-propoxy-silane, vinylmethyl-di-iso-propoxy-silane, vinylmethyl-di-n-butoxy-silane, vinylmethyl-di-sec-butoxy-silane, vinylmethyl-di-tert-butoxy-silane, vinylmethyl-di-(2-methoxy-isopropyloxy)-silane, and vinylmethyl-dioctyloxy-silane.

Particularly preferred silanes are those of the formula $CH_2=CR^2-(CH_2)_{0-1}Si(OR')_3$ and $CH_2=CR^2CO_2-(CH_2)_3Si(OR^1)_3$, in which $R^1$ is a branched or unbranched alkali radical having 1 to 4 carbon atoms and $R^2$ is H or $CH_3$.

Examples thereof are γ-(meth)acryloyloxypropyl-tris-(2-methoxyethoxy)-silane, γ-(meth)acryloyloxypropyl-tris-methoxy-silane, γ-(meth)acryloyloxy-propyl-tris-ethoxy-silane, γ-(meth)acryloyloxypropyl-tris-n-propoxy-silane, γ-(meth)acryloyloxypropyl-tris-iso-propoxy-silane, γ-(meth)acryloyloxy-propyl-tris-butoxy-silane, γ-acryloyloxypropyl-tris-(2-methoxyethoxy)-silane, γ-acryloyloxypropyl-tris-methoxy-silane, γ-acryloyloxypropyl-tris-ethoxy-silane, γ-acryloyloxypropyl-tris-n-propoxy-silane, γ-acryloyloxy-propyl-tris-iso-propoxy-silane, γ-acryloyloxypropyl-tris-butoxy-silane, and vinyl-tris-(2-methoxyethoxy)-silane, vinyl-tris-methoxy-silane, vinyl-tris-ethoxy-silane, vinyl-tris-n-propoxy-silane, vinyl-tris-iso-propoxy-silane, and vinyl-tris-butoxy-silane. The stated silane compounds can where appropriate also be used in the form of their (partial) hydrolyzates.

The fraction of the monomers A4, in combination where appropriate with further comonomers from this group, is 0.05% to 5%, preferably 0.1% to 2%, by weight based on the total amount of the monomers employed.

Instead of or in addition to the monomers A4 it is possible to add further silanes to the coating composition of the invention, such as aminosilanes or epoxysilanes. This can be done during or, in particular, after the copolymer has been prepared.

Suitable comonomers of group A5 possess preferably at least one stabilizing nonionic or ionic group, preferably an acid group, in the molecule, and such groups stabilize the emulsion polymer additionally via polymer-bonded functional groups and/or charges.

Suitable comonomers A5 with stabilizing nonionic groups include, in particular, esters of ethylenically unsaturated aliphatic monocarboxylic and/or dicarboxylic acids with polyalkylene glycols, preferably polyethylene and/or polypropylene glycols, or esters of ethylenically unsaturated carboxylic acids with amino alcohols, such as (meth)acrylic esters of amino alcohols, of diethylaminoethanol for example, and/or (meth)acrylic esters with dimethylaminoethanol, and also (meth)acrylic esters with dihydric aliphatic alcohols of chain length $C_2$-$C_{18}$ in which only one alcohol group is esterified.

Additionally suitable are amides of ethylenically unsaturated carboxylic acids, such as amides of acrylic and methacrylic acid and N-methylolamides of acrylic and methacrylic acids, and also their ethers. A further group of these monomers are N-vinylamides, including the N-vinyl lactams, such as vinylpyrrolidone or N-vinyl-N-methylacetamide, for example.

Suitable comonomers A5 with stabilizing ionic groups include ethylenically unsaturated carboxylic acids or sulfonic acids which have one or two carboxyl groups or one sulfonic acid group. In place of the free acids it is also possible to use their salts, preferably alkali metal salts or ammonium salts.

Examples thereof are acrylic acid, methacrylic acid, crotonic acid, maleic acid, fumaric acid, itaconic acid, vinylsulfonic acid, styrenesulfonic acid, monoesters of maleic and/or fumaric acid and itaconic acid with monohydric aliphatic saturated alcohols of chain length $C_1$-$C_{18}$, and also their alkali metal salts or ammonium salts, or (meth)acrylic esters of sulfo alkanols, an example being sodium 2-sulfoethyl methacrylate.

Particular preference is given to acrylic acid, methacrylic acid, crotonic acid, itaconic acid and/or vinylsulfonic acid.

For further comonomers A5 which can be used in the copolymer it is possible to employ any desired comonomers not belonging to groups A1, A2, A3 or A4. Examples thereof are esters of aliphatic carboxylic acids of chain length $C_3$-$C_{12}$ with unsaturated alcohols of chain length $C_3$-$C_{18}$, the acrylic and methacrylic esters of monohydric aliphatic saturated alcohols, vinyl chloride, vinylidene chloride, acrylonitrile and methacrylonitrile, butadiene, isoprene, $C_9$-$C_{16}$ alpha-olefins, 2-chlorobutadiene, 2,3-dichlorobutadiene, tetrafluoroethylene, styrene, vinyl ethers of monohydric aliphatic saturated alcohols of chain length $C_1$-$C_{18}$, divinyl and diallyl esters of saturated and unsaturated aliphatic dicarboxylic acids of chain length $C_3$-$C_{18}$, vinyl and allyl esters of acrylic acid and crotonic acid, triallyl cyanurate, and ethylenically unsaturated epoxide compounds, such as glycidyl methacrylate or glycidyl acrylate. Preferred further comonomers A5 are acrylic esters of monohydric aliphatic saturated alcohols of chain length $C_4$-$C_8$, or $C_{14}$-$C_{16}$ alpha-olefins or butadiene or ethylenically unsaturated epoxide compounds.

The amount of any further comonomers A5 present, in combination where appropriate with further comonomers from this monomer group, is typically up to 10%, preferably up to 8%, by weight based on the total copolymer composition A).

The comonomers A5 can also be present in the polyvinyl ester in a combination of two or more thereof alongside one another.

Preferably, in addition to the abovementioned monomer groups A1, A2, A3, and, if desired, A4, or A1 and A2 and, if desired, A4, or A1 and A3 and, if desired, A4, at least one further comonomer of group A5 is used, especially vinylsulfonic acid or its alkali metal salts.

The vinyl ester copolymer emulsions used in accordance with the invention comprise at least one protective colloid and/or at least one emulsifier. Preferably protective colloid and emulsifier are present.

Suitable protective colloids, i.e., suitable polymeric stabilizers, include methylcelluloses, hydroxyethylcelluloses and propylcelluloses, and sodium carboxymethylcellulose, gelatin, casein, starch, gum arabic, hydroxyethylstarch, sodium alginate, and also homopolymers or copolymers derived from (meth)acrylic acids and/or (meth)acrylic esters, and also N-vinyl amides, including the N-vinyl lactams, and/or the water-soluble salts of these homopolymers or copolymers. Examples of (meth)acrylic acids are polyacrylic acid and/or polymethacrylic acid. Examples of N-vinyl amides are N-vinylpyrrolidone and N-vinylacetamide.

The preferred protective colloid is polyvinyl alcohol. Suitable polyvinyl alcohol possesses degrees of hydrolysis of 60 to 100 mol % and viscosities of the 4% strength aqueous solutions at 20° C. of 2-70 mPa*s, in particular 30 to 70 mPa*s.

The stated protective colloids can of course also be used in the form of mixtures.

The amount of protective colloids used, based on the copolymer b), is typically 0.1 to 15 parts by weight, preferably 0.3 to 1 part, by weight.

Emulsifiers used are generally nonionic emulsifiers or combinations of nonionic with ionic emulsifiers.

Examples of nonionic emulsifiers are acyl, alkyl, oleyl, and alkylaryl oxethylates. These products are available for example commercially under the name Genapol® or Lutensol®. These include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{12}$-$C_{14}$ fatty alcohol (3-8)ethoxylates, $C_{13}C_{15}$ oxo-process alcohol (3-30)ethoxylates, $C_{16}C_{18}$ fatty alcohol (11-80)ethoxylates, $C_{10}$ oxo-process alcohol (3-11)ethoxylates, $C_{13}$ oxo-process alcohol (3-20)ethoxylates, polyoxyethylenesorbitan monooleate with 20 ethylene oxide groups, copolymers of ethylene oxide and propylene oxide with a minimum ethylene oxide content of 10% by weight, the polyethylene oxide (4-20) ethers of oleyl alcohol, and the polyethene oxide (4-20) ethers of nonylphenol. Particularly suitable are the polyethylene oxide (4-20) ethers of fatty alcohols, particularly those of oleyl alcohol.

Nonionic emulsifiers are used typically in an amount of 0.1 to 10 parts by weight, preferably 0.5% to 5.0%, based on the copolymer A). It is also possible to use mixtures of nonionic emulsifiers.

In order to improve the stability further it is also possible to use further stabilizers, which in this case are ionic, preferably anionic, as coemulsifiers. Mention may be made by way of example of sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfation and/or acetylation products, alkyl sulfates, including those in the form of triethanolamine salts, alkyl-($C_{10}$-$C_{20}$)-sulfonates, alkyl($C_{10}$-$C_{20}$)-arylsulfonates, dimethyldialkyl($C_8$-$C_{18}$)-ammonium chloride, and their sulfation products, alkali metal salts of sulfosuccinic esters with aliphatic saturated monohydric alcohols of chain length $C_4$-$C_{16}$, sulfosuccinic acid-4 esters with polyethylene glycol ethers of monohydric aliphatic alcohols of chain length $C_{10}$-$C_{12}$(di-sodium salt), sulfosuccinic acid-4 esters with polyethylene glycol nonylphenyl ether (disodium salt), sulfosuccinic acid biscyclohexyl ester (sodium salt), lignosulfonic acid, and the calcium, magnesium, sodium, and ammonium salts thereof, resin acids, hydrogenated and dehydrogenated resin acids and their alkali metal salts, dodecylated sodium diphenyl ether disulfonate, and also sodium lauryl sulfate, or ethoxylated sodium lauryl ether sulfate (EO degree of 3).

Mixtures of ionic emulsifiers can also be used.

The fraction of ionic emulsifiers, based on the total amount of the emulsifiers employed, is typically 0.1 to 5 parts by weight, preferably 0.5% to 3.0% by weight, based on the copolymer b).

The aqueous copolymeric polyvinyl ester dispersions used in accordance with the invention typically possess solids contents of 20% to 70%, preferably 30% to 65%, and more preferably 40% to 60%, by weight.

The fraction of component b) in the coating composition of the invention is typically 5% to 50%, preferably 10% to 50%, more preferably 15% to 30%, by weight based on the total solids content.

As component c) the coating composition of the invention comprises pigments and/or fillers. These are finely divided solids, organic or inorganic in nature, which are colored or noncolored.

Examples of pigments are inorganic pigments, such as titanium dioxide, zinc dioxide, zinc sulfide, iron oxides and/or carbon black, or organic pigments. Preference is given to titanium dioxide.

Examples of fillers are carbonates, such as dolomite, calcite, and chalk. Further examples are silicates, such as talc, kaolin, china clay, and mica. Preference is given to calcium carbonate and mica.

The fraction of component c) in the coating composition of the invention is typically 20% to 95%, preferably 20% to 90%, and more preferably 30% to 87%, by weight based on the total solids content.

If desired, the coating compositions of the invention further comprise further adjuvants d) which are customary per se.

Additives and further constituents which can be used include film-forming assistants, such as white spirit, Texanol®, TxiB®, butyl glycol, butyl diglycol, butyl dipropylene glycol, and butyl tripropylene glycol; plasticizers, such as dimethyl phthalate, diisobutyl phthalate, diisobutyl adipate, Coasol B®, and Plastilit 3060®; wetting agents, such as AMP 90®, TegoWet.280®, Fluowet PE®; thickeners, such as polyacrylates or polyurethanes, such as Borchigel L75® and Tafigel PUR 60®; defoamers, examples being mineral-oil defoamers and silicone defoamers; UV protectants, such as Tinuvin 1130® and other additives and assistants of the kind typical in the formulation of coating materials.

The fraction of component d) in the coating composition of the invention can be up to 25% by weight, preferably 2% to 15%, and in particular 5% to 10%, by weight based on the total solids content.

In contrast to coating compositions which have been typical to date it is possible with the compositions according to the invention to forego the use of preservatives.

The minimum film formation temperature of the coating compositions of the invention is typically below 25° C., preferably below 15° C. The film formation temperature can be modified and tailored by adding conventional coalescers.

With particular preference the coating composition of the invention comprises a component b) derived from A1) vinyl acetate, A2) ethylene, A3) vinyl esters of branched aliphatic carboxylic acids having 9 to 11 carbon atoms, if desired, ethylenically unsaturated monomers A4) containing silane groups, and, if desired, A5) ethylenically unsaturated carboxylic acids having one or two carboxyl groups, ethylenically unsaturated sulfonic acids having one sulfonic acid group, or salts thereof, the amount of structural repeating units derived from vinyl acetate in the copolymer being 50% to 70% by weight, the amount of structural repeating units derived from ethylene in the copolymer being 15% to 20% by weight, the amount of structural repeating units derived from vinyl esters of branched aliphatic carboxylic acids having 9 to 11 carbon atoms in the copolymer being 10% to 40% by weight, the amount of structural repeating units derived, where appropriate, from ethylenically unsaturated monomers A4) containing silane groups in the copolymer being—if present—up to 5% by weight, and the amount, where appropriate, of structural repeating units derived from ethylenically unsaturated carboxylic acids having one or two carboxyl groups, ethylenically unsaturated sulfonic acids having one sulfonic acid group, or salts thereof, in the copolymer being—if present—up to 5% by weight.

This invention additionally provides a method of producing the coating compositions of the invention.

The invention therefore likewise provides a method of producing aqueous coating compositions, comprising the mixing of the above-defined components a), b), if desired, c), and, if desired, d).

Component b) is prepared typically by free-radical emulsion polymerization. This can be carried out in a batch process, in a feed process, in a combined batch/feed process or in a continuous process.

It is preferred, however, to operate in a combined batch/feed process or, with particular preference, in a feed process, in which case typically a portion of the monomers (1% to 15% by weight) is included in the initial charge in order to start the polymerization. The metering of the monomers may take place either together or in separate feeds. Additionally it may be advantageous in certain embodiments to carry out a seed polymerization in order to set specific particle sizes and particle-size distributions.

Examples of free-radical initiators used include the following: hydrogen peroxide, benzoyl peroxide, cyclohexanone peroxide, isopropylcumyl hydroperoxide, persulfates of potassium, of sodium, and of ammonium, peroxides of even-numbered saturated monobasic aliphatic carboxylic acids of chain length $C_8$-$C_{12}$, tert-butyl hydroperoxide, di-tert-butyl peroxide, diisopropyl percarbonate, azoisobutyrodinitrile, acetyl cyclohexanesulfonyl peroxide, tert-butyl perbenzoate, tert-butyl peroctoate, bis(3,5,5-trimethyl)-hexanoyl peroxide, tert-butyl perpivalate, hydroperoxypinane, and p-methane hydroperoxide. The aforementioned compounds can also be used as part of a redox system, at the same time using transition metal salts such as iron(II) salts or other reducing agents. As reducing agents and/or regulators it is possible as well to use alkali metal salts of oxymethanesulfinic acid, mercaptans of chain length $C_{10}$-$C_{14}$, but-1-en-3-ol, hydroxylamine salts, sodium dialkyldithiocarbamate, sodium bisulfite, ammonium bisulfite, sodium dithionite, diisopropylxanthogen disulfide, ascorbic acid, tartaric acid, isoascorbic acid, boric acid, urea, and formic acid.

Preference is given, however, to using water-soluble persulfates, especially ammonium persulfate or sodium persulfate, in order to start the polymerization.

The protective colloid used for the purpose of stabilization can likewise alternatively be included in its entirety in the initial charge at the beginning of the polymerization, or included partly in the initial charge and partly metered in, or metered in completely during the polymerization.

The emulsifier used for the purpose of stabilization can likewise alternatively be included in its entirety in the initial charge at the beginning of the polymerization, or included partly in the initial charge and partly metered in, or metered in completely during the polymerization.

The pH of the dispersion is typically between 2 and 7, preferably between 2.5 and 6.

The polymerization temperature ranges typically from 20 to 120° C., preferably from 30 to 110° C., and very preferably from 45 to 95° C.

For the purpose of demonomerization after the end of the polymerization it is possible to add on a further aftertreatment, preferably a chemical aftertreatment, in particular using redox catalysts, such as, for example, combinations of the abovementioned oxidizing agents and reducing agents. A further possibility is to remove residual monomer in a known way, by means for example of physical demonomerization, i.e., distillative removal (in particular by way of steam distillation), or by stripping with an inert gas.

Particularly efficient is a combination of physical and chemical methods, which allows a reduction in residual monomers to very low levels (<1000 ppm, preferably <100 ppm).

The aqueous coating compositions of the invention are suitable for coating substrates of all kinds, as paints for example, preferably in the construction sector.

These uses are likewise provided by the present invention.

The examples which follow serve to illustrate the invention. The parts and percentages specified in the examples are by weight, unless otherwise noted.

COMPARATIVE EXAMPLE 1

Preparation of a Vinyl Acetate with Ethylene Copolymer Dispersion which Cannot be Used in Accordance with the Invention, with Subsequent Elimination of Residual Monomer A pressure apparatus with stirrer, jacket heating, and metering pumps was charged with an aqueous solution composed of the following constituents:

26 600 g of water, 86 g of sodium acetate, 1440 g of a 70% strength by weight aqueous solution of an oxoalkyl ethoxylate with 28 mol of ethylene oxide, 2160 g of a 10% strength by weight aqueous polyvinyl alcohol solution (viscosity of the 4% strength by weight aqueous solution:

18 mPa*s), 577 g of a 30% strength by weight aqueous sodium vinylsulfonate solution, and 8 g of a 1% strength by weight aqueous solution of Fe(II) (SO$_4$)×7H$_2$O. The pH of the solution was 7.2. The apparatus was freed from atmospheric oxygen, and ethylene was injected into the apparatus. At an ethylene pressure of 20 bar, 1500 g of vinyl acetate were metered in. Heating was carried out to an internal temperature of 60° C., in the course of which the ethylene pressure was raised to 40 bar. At that point 10% of a solution of 27.1 g of Bruggolit C in 2000 g of water was metered in. Subsequently 10% of a solution of 27.1 g of tert-butyl hydroperoxide in 2000 g of water was metered in, with an internal temperature of 60° C., and cooling was carried out in order to remove the heat of reaction. 28 800 g of vinyl acetate and the remaining 90% of the reducing solution and initiator solution were subsequently metered in, the ethylene pressure being held at 40 bar, until there were 3744 g of ethylene in the reactor. Thereafter a solution of 36 g of sodium persulfate in 600 g of water was metered in and the internal temperature was raised to 80° C. and held at that temperature for 1 hour. Subsequently, with stirring, the major part of the unreacted ethylene was removed as a gas, and 2 l of water were added. Then, with application of reduced pressure, 2 l of water were distilled off over the course of 2 hours, thereby reducing the residual vinyl acetate content of the dispersion to 0.05% by weight, based on the dispersion. Repeating the separation procedure gave a residual vinyl acetate content of 0.012% by weight.

INVENTIVE EXAMPLES 2 TO 11

Preparation of Vinyl Acetate/ethylene/VeoVa10 Copolymer Dispersions which can be Used in Accordance with the Invention, with Subsequent Elimination of Residual Monomers and Other Volatile Constituents.

Polymerization was carried out in the same apparatus and in accordance with the same method as that used in Comparative Example 1, with the modification that the total amount of 34 044 g of monomer was replaced by a mixture with different amounts of vinyl acetate, VeoVa10 and ethylene (see Table 1). Specifically, therefore, the following amounts (in % based on 34 044 g) of monomer were copolymerized:

TABLE 1

| Example No. | Vinyl acetate (%) | Ethylene (%) | VeoVa10 (%) |
|---|---|---|---|
| C1 | 88.8 | 11.2 | 0 |
| 2 | 69.8 | 15.2 | 15 |
| 3 | 75.8 | 19.2 | 5 |
| 4 | 55.8 | 19.2 | 25 |
| 5 | 83.8 | 11.2 | 5 |
| 6 | 63.8 | 11.2 | 25 |
| 7 | 83.8 | 11.2 | 5 |
| 8 | 69.8 | 15.2 | 15 |
| 9 | 75.8 | 19.2 | 5 |
| 10 | 63.8 | 11.2 | 25 |
| 11 | 55.8 | 19.2 | 25 |

TABLE 2

Physical properties of the polymer dispersions prepared

| Example No. | Solids (%) | pH | Particle size (nm) | MFT (° C.) | T$_g$ (° C.) |
|---|---|---|---|---|---|
| C1 | 50.2 | 4.4 | 177 | <0 | 14 |
| 2 | 50.1 | 4.4 | 139 | <0 | 2 |
| 3 | 50.0 | 4.4 | 153 | <0 | 1 |
| 4 | 50.1 | 4.4 | 165 | <0 | −8 |
| 5 | 50.3 | 4.3 | 169 | <0 | 13 |
| 6 | 50.3 | 4.3 | 145 | <0 | 5 |
| 7 | 50.2 | 4.3 | 153 | <0 | 15 |
| 8 | 50.0 | 4.4 | 162 | <0 | 3 |
| 9 | 50.1 | 4.4 | 142 | <0 | 0 |
| 10 | 50.2 | 4.3 | 148 | <0 | 4 |
| 11 | 49.9 | 4.4 | 136 | <0 | −8 |

APPLICATION EXAMPLES

The invention is described in more detail below through the formulation of emulsion paints having the following composition:

| Constituents | Parts by weight |
|---|---|
| Water | 333.0 |
| Dispersant (stabilized alkali metal phosphate) | 2.0 |
| Cellulose ether (type HEC, high viscosity) | 4.0 |
| Aqueous solution of a quaternary ammonium salt | 3.0 |
| Mineral oil-based defoamer | 3.0 |
| Titanium dioxide pigment | 150.0 |
| Filler, limestone, particle size 1 μm | 100.0 |
| Filler, limestone, particle size 6 μm | 180.0 |
| Mica filler, particle size 28 μm | 50.0 |
| Copolymer dispersion[1] | 120.0 |
| 29% strength aqueous potassium silicate solution | 45.0 |
| Total | 1090.0 |

[1] The copolymers used were those of Examples C1 to 11 (see Table 1)

The hydroxyethylcellulose in powder form was sprinkled into the water and dissolved with stirring, after which dispersant, mineral oil-based defoamer, and aqueous solution of a quaternary ammonium salt were added with stirring. With stirring by means of a dissolver the pigments and fillers were incorporated and dispersed, and then, with the stirring speed being raised to 5000 rpm, dispersion was continued at 5000 rpm, the temperature of the pigment/filler paste climbing to 60° C. It was cooled to 30° C. With a low level of stirring, the copolymer dispersion and the aqueous potassium silicate solution were then stirred in.

The key characteristics of the different emulsion paints are the pigment-binding capacity (WSR), the odor, the thixotropy, and the change in pH after hot storage in the emulsion paint prepared in accordance with the above formulation (see Table 3).

TABLE 3

| Copolymer from Example | WSR 28 d[1] | Odor 28 d[2] | Thix 28 d[3] | pH 1 d RT[4] | pH 28 d RT[5] | pH 28 d 50° C.[6] |
|---|---|---|---|---|---|---|
| C1 | 21 | 0 | 0/− | 11.3 | 9.8 | 9.8 |
| 2 | 18 | + | 0/− | 11.2 | 11.1 | 10.6 |
| 3 | 19 | 0/+ | + | 11.2 | 11.1 | 10.6 |
| 4 | 22 | 0/+ | + | 11.2 | 11.2 | 11.0 |
| 5 | 18 | 0 | −/−− | 11.2 | 11.0 | 10.0 |
| 6 | 17 | 0/+ | 0 | 11.2 | 11.1 | 10.6 |
| 7 | 18 | + | −/−− | 11.2 | 11.0 | 9.9 |
| 8 | 18 | + | 0/+ | 11.2 | 11.1 | 10.6 |
| 9 | 13 | 0 | 0/+ | 11.2 | 11.1 | 10.6 |
| 10 | 17 | + | 0 | 11.2 | 11.1 | 10.6 |
| 11 | 20 | +/++ | ++ | 11.2 | 11.2 | 11.0 |

[1]WSR 28 d: Pigment-binding capacity after 28 days' storage under standard conditions at room temperature; figures in μm
[2]Odor 28 d: Odor after 28 days' storage under standard conditions at room temperature; assessment according to subjective scale of −−/−/0/+/++ (highly deficient to very good)
[3]Thix. 28 d: Thixotropy after 28 days' storage under standard conditions at room temperature; assessment according to subjective scale of −−/−/0/+/++ (highly deficient to very good)
[4]pH 1 d RT: pH after 1 day's storage under standard conditions at room temperature
[5]pH 28 d RT: pH after 28 days' storage under standard conditions at room temperature
[6]pH 28 d 50° C.: pH after 28 days' storage under standard conditions at 50° C.

Further formulas of emulsion paints of the composition below were tested.

TABLE 4

| Constituents | Parts by weight |
|---|---|
| Water | 343.0 |
| Dispersant (stabilized alkali metal phosphate) | 2.0 |
| Cellulose ether (type HEC, high viscosity) | 4.0 |
| Aqueous solution of a quaternary ammonium salt | 3.0 |
| Mineral oil-based defoamer | 3.0 |
| Titanium dioxide pigment | 150.0 |
| Filler, limestone, particle size 1 μm | 100.0 |
| Filler, limestone, particle size 6 μm | 180.0 |
| Mica filler, particle size 28 μm | 50.0 |
| Copolymer dispersion[1] | 120.0 |
| Base as per table below | 45.0 |

[1]The copolymer used was that of Example 11 (see Table 1)

The two paint formulas were tested for pH and for loss of abrasion. The results are found in Table 5 below.

TABLE 5

| Basic agent | Loss on abrasion after 28 d (μm)[1] | pH 1 d RT[2] | pH 28 d 50° C.[3] |
|---|---|---|---|
| NaOH | 27 | 12.7 | 12.4 |
| KOH | 25 | 12.5 | 12.1 |
| NaOH/KCl | 31 | 12.9 | 12.7 |
| NaOH/glycine | 24 | 12.2 | 11.4 |

[1]Loss on abrasion, determined in accordance with DIN ISO 11998 after 28 days' storage at 50% atmospheric humidity and at 23° C.; sample preparation: after one day the emulsion paints were drawn down onto Leneta film; measurement: after storage, investigation was carried out using an Erichsen nonwoven abrasion instrument
[2]pH1 d RT: pH after 1 day's storage under standard conditions at room temperature
[3]pH 28 d 50° C.: pH after 28 days' storage under standard conditions at 50° C.

The invention claimed is:

1. A preservative-free aqueous coating composition having a pH of at least 10, comprising
   a) at least one strongly basic agent to set the pH,
   b) at least one emulsion of a copolymer derived from
      A1) vinyl esters of aliphatic saturated carboxylic acids having a chain length of $C_1$-$C_4$,
      A2) alpha-olefins having 2 to 8 carbon atoms, and
      A3) vinyl esters of aliphatic saturated carboxylic acids having a chain length of $C_5$-$C_{18}$,
      A4) ethylenically unsaturated monomers containing silane groups, wherein said ethylenically unsaturated monomers containing silane groups are selected from the group consisting of compounds of formula $CH_2=CR^2-(CH_2)_{0-1}Si(CH_3)_{0-1}(OR^1)_{3-2}$, compounds of formula $CH_2=CR^2CO_2-(CH_2)_3Si(CH_3)_{0-1}(OR^1)_{3-2}$, and mixtures thereof, wherein $R^1$ is a branched or unbranched alkyl radical having 1 to 12 carbon atoms, wherein said branched or unbranched alkyl radical can optionally be interrupted by an ether group, and $R^2$ is H or $CH_3$, and
      A5) optionally, further comonomers,
      the sum of components A1, A2, A3, A4, and optionally components A5 making 100% by weight,
   c) optionally, pigment and/or filler, and
   d) optionally, further additives.

2. The coating composition of claim 1, wherein component A1) is vinyl acetate.

3. The coating composition of claim 1, wherein component A2) is ethylene.

4. The coating composition of claim 1, wherein component A3) is a vinyl ester of α-branched carboxylic acids having 9 to 11 carbon atoms in the acid radical.

5. The coating composition of claim 1, wherein component A5) is present and is an ethylenically unsaturated carboxylic acid having one or two carboxyl groups and its salts, an ethylenically unsaturated sulfonic acid having one sulfonic acid group and its salts, and mixtures thereof.

6. The coating composition of claim 1, wherein component a) is a water-soluble silicate.

7. The coating composition of claim 1, wherein component a) is potassium waterglass.

8. The coating composition of claim 1, wherein component a) is present in the coating composition in an amount up to 5% by weight, based on the total solids content.

9. The coating composition of claim 1, wherein component b) comprises structural repeating units derived from the monomer groups A1, A2, A3, A4, and A5.

10. The coating composition of claim 1, wherein component b) comprises at least one protective colloid, at least one emulsifier, or mixtures thereof.

11. The coating composition of claim 5, wherein component A5) is selected from the group consisting of acrylic acid, methacrylic acid, crotonic acid, itaconic acid, vinylsulfonic acid, and mixtures thereof.

12. The coating composition of claim 10, wherein component b) comprises polyvinyl alcohol.

13. The coating composition of claim 2, wherein component A2) is ethylene.

14. The coating composition of claim 13, wherein component A3) is a vinyl ester of a-branched carboxylic acids having 9 to 11 carbon atoms in the acid radical.

15. The coating composition of claim 14, wherein component A4) is a silane of formulae $CH_2=CR^2-(CH_2)_{0-1}Si(CH_3)_{0-1}(OR^1)_{3-2}$, $CH_2=CR^2CO_2-(CH_2)_3Si(CH_3)_{0-1}(OR^1)_{3-2}$, and mixtures thereof, wherein $R^1$ is a branched or unbranched alkyl radical having 1 to 8 carbon atoms and $R^2$ is H or $CH_3$.

16. The coating composition of claim 14, wherein component A5) is present and is an ethylenically unsaturated carboxylic acid having one or two carboxyl groups and its salts, an ethylenically unsaturated sulfonic acid having one sulfonic acid group and its salts, and mixtures thereof.

17. The coating composition of claim 14, wherein component a) is potassium waterglass.

18. The coating composition of claim 14, wherein component a) is present in the coating composition in an amount up to 5% by weight, based on the total solids content.

* * * * *